M. Fletcher,
Baling Hay,
N°40,922.        Patented Dec. 15, 1863.
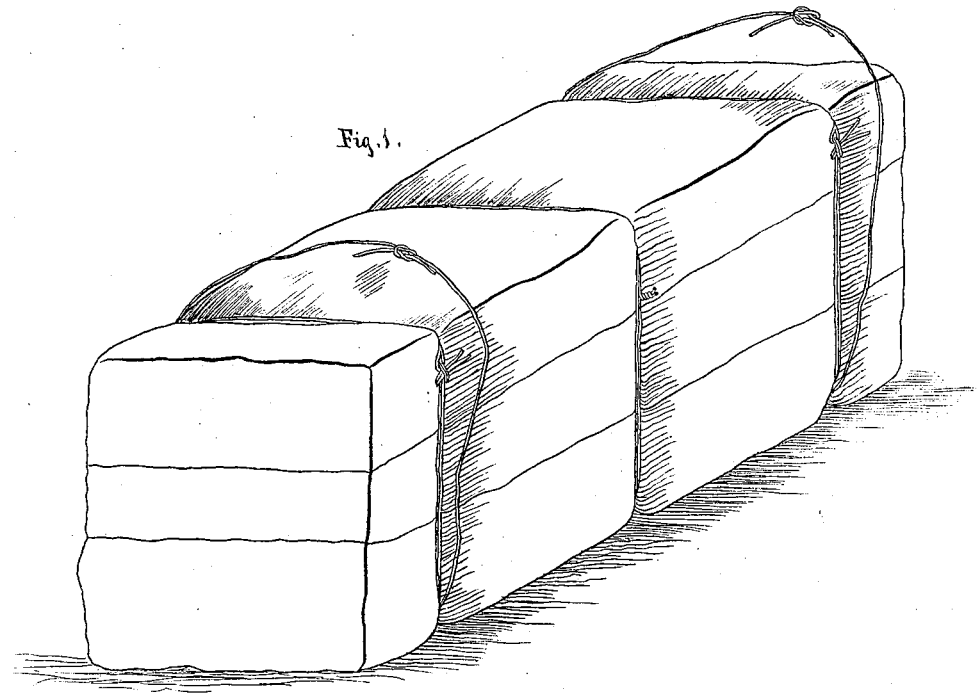
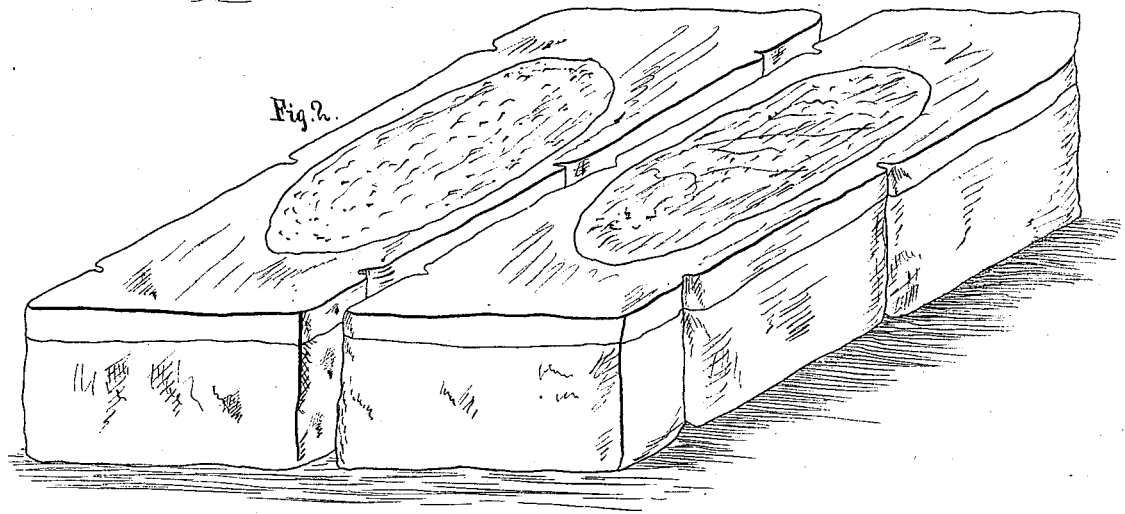
Witnesses
Wm. D. Baldwin
John W. Shugert
Inventor:
Matthew Fletcher
By Henry Baldwin
Attorney

UNITED STATES PATENT OFFICE.

MATTHEW FLETCHER, OF LOUISVILLE, KENTUCKY.

IMPROVED FORAGE-RATION.

Specification forming part of Letters Patent No. 40,922, dated December 15, 1863.

*To all whom it may concern:*

Be it known that I, MATTHEW FLETCHER, of the city of Louisville, county of Jefferson, and State of Kentucky, have invented a new and improved mode of packing forage in rations for animals, more particularly for such animals as are employed in armies for artillery, cavalry, or transportation; and I do hereby declare that the following is a full and exact description thereof, reference being had to the accompanying drawings, and to the letters of reference thereon, making part of this specification, in which—

Figure 1 is an external view of a packed ration, and Fig. 2 a central longitudinal section through the same.

In feeding animals in large numbers on long journeys, when employed in armies or subject to frequent changes of places of rest, it is found absolutely impossible to furnish their food in proper condition and quantity without a vast waste, great expense, and an embarrassing transportation train, and then, even under the most careful management, the animals are fed unequally and with provender mingled with dust, molded from damp and heat, or otherwise much damaged by rough handling and by inclement weather.

Now, it is the object of my invention to supply animals in any number with equal rations of mixed hay and grain in cheap and secure packages that will not be subject to injury from transportation or hygrometric or thermometric atmospheric changes, and will at all times, with ordinary care, present the sound, uninjured ration in determinate proportions of grain and rough food, so that the animal can eat either the grain contained within the package constituting the ration, the rough food alone constituting the outer package, or both together, as his appetite or convenience may prompt, while the transportation will be reduced to its minimum quantity indispensably necessary for the number of rations required in any service; and to this end my invention consists in dividing the ration for animals in any determined proportions of grain and rough food, and packing securely the grain within tight packages of the rough food, whether of straw, fodder, or hay, so that both, when thus combined, shall constitute one ration for one animal for a single day, and this ration can of course be duplicated for any number of animals for any duration of time or in whatever service employed.

To enable others skilled in the art to make and use my invention, I will proceed to describe its construction.

The ration for animals used in military service is fixed, after long experience, at fourteen pounds of hay and twelve pounds of oats, corn, or barley for a horse for a single day, and the same quantity of hay, with nine pounds of grain, for a mule for the same time. Now, I take the grain, either whole or crushed, and in separate kinds or mixed, and divide the quantity for a day's ration into two or three portions, and closely compress these divided portions into a rectangular form in a suitable press or frame. I then surround one portion of this compressed grain with the same divisional proportion of hay wound about, around, and over the grain, and compress the whole in a suitable press into the rectangular form of a bale, and fasten it with suitable strings or wire, when it is removed from the press and is ready for transportation. Thus the ration of fourteen pounds of hay and twelve pounds of grain may be divided into three parcels each, and each one-third portion of the ration, consisting of four and three quarter pounds of hay and four pounds of grain, may be compressed into a package, as seen in Fig. 1 of the drawings, of about twelve inches long by six inches square, and each of these portions will constitute a feed, so that the horse can eat at three meals his daily ration without waste and in perfectly equal divisions. When the ration is to be given, it is laid open, as shown in Fig. 2 of the drawings, by being cut through the middle, and the half-bundles will each constitute a trough from which the horse can eat the neatly and sweetly preserved grain and afterward the rough food in which it was packed. It is manifest that the whole ration or its divisions may be packed separately; that the pressure may be such as to exclude the penetration of moisture into the grain through the hay or rough food that constitutes the covering of the package, and that no fermentation of the grain can be produced by heat and moisture in the covering. I thus secure a sweet, sound ration in the most compact form for transportation and without any expensive covering of canvas or bagging.

Now, I am aware that rations of whole or bruised grain and cut hay have been packed in canvas for foraging army animals, and, therefore, I do not claim such; nor do I limit myself to the precise proportions or divisions named; but What I do claim as my invention, and desire to secure by Letters Patent of the United States, is—

The forage ration composed of proper relative proportions of grain and rough food, when the former is secured and preserved within the latter, both constituting one bale or package, made substantially in the manner and for the purposes described.

In testimony whereof I have hereunto subscribed my name.

MATTHEW FLETCHER. [L. S.]

Witnesses:
R. T. DURRETT,
CHAS. P. RUDD.